(12) United States Patent
Chen et al.

(10) Patent No.: US 6,188,674 B1
(45) Date of Patent: Feb. 13, 2001

(54) METHOD AND APPARATUS FOR PACKET LOSS MEASUREMENT IN PACKET NETWORKS

(76) Inventors: Xiaoqiang Chen, 32 Berkeley Ct., Morganville, NJ (US) 07751; Denis Andreyevich Khotimsky, 42 Victoria Dr., Eatontown, NJ (US) 07724

( * ) Notice: Under 35 U.S.C. 154(b), the term of this patent shall be extended for 0 days.

(21) Appl. No.: 09/024,593
(22) Filed: Feb. 17, 1998
(51) Int. Cl.[7] .............................. H04L 12/26; H04L 1/00
(52) U.S. Cl. ........................ 370/252; 370/413; 370/473; 370/522
(58) Field of Search ..................... 370/229–236, 370/250, 252, 253, 410, 412, 413, 389, 395, 470, 471, 522, 473; 709/230, 236, 235

(56) References Cited

U.S. PATENT DOCUMENTS

| | | | |
|---|---|---|---|
| 5,491,697 | * 2/1996 | Tremel et al. | 714/704 |
| 5,668,801 | * 9/1997 | Grunenfelder | 370/253 |
| 5,793,976 | * 8/1998 | Chen et al. | 709/224 |
| 5,822,540 | * 10/1998 | Caldara et al. | 709/230 |
| 5,978,356 | * 11/1999 | Elwalid et al. | 370/230 |

* cited by examiner

*Primary Examiner*—Seema S Rao
(74) *Attorney, Agent, or Firm*—Henry T. Brendzel (57) ABSTRACT

A simple and efficient method for packet loss measurement in high-speed switches is achieved by identifying traffic flows in the ingress side of switches, and measuring packets losses for the identifies flows on the egress side of the switches. Specifically, on the ingress side of the switch, the last packet of each fixed size incoming packet block is marked to make it distinct from other packets in the block. On the egress side, the packet flow is monitored and the packets are counted using the block size as a counting modulo. The value of this counter at the receipt of a marked packets is used to update the number of packets that do not make their way across the switch. The method is applicable to multicast as well as to unicast packets. This method is simple in that it only requires two marking counters per distinct flow, one at ingress and one at egress, and two other counters at the egress per each measured flow. It is also efficient, as it can achieve any degree of accuracy with little implementation cost. This method can be applied to a wide range of switch/router designs where simple and fast hardware implementation is desirable.

23 Claims, 4 Drawing Sheets

METHOD AND APPARATUS FOR PACKET LOSS MEASUREMENT IN PACKET NETWORKS

BACKGROUND

In various communications networks user information is carried in packets that are routed from the source to the destination via switches. A switch buffers each packet received from upstream sources until a decision is made when and to which outgoing link the packet need to be forwarded. Since the buffer space is always finite, packets could be dropped within a switch when buffer overflow occurs or when packets with a lower priority class have to give way to those with a higher priority class. In applications where a particular quality of service is desired or promised, it is obviously important for a switch to monitor packet losses incurred within the switch. Moreover, routing protocols require this information to be advertised within a network or a group of nodes, to facilitate path selections and to avoid congestion.

A high speed switch can generally be represented by a multi-stage interconnection where an N plurality of ingress modules are connected to a central switch fabric, and the outputs of the switch fabric are connected to an N plurality of egress modules. Each ingress and each egress module couples K input links and output links, respectively. Links carry streams of packets, where the destination of each packet is specified in the packet's header.

High speed switches of such construction typically include buffering within each of the elements (ingress modules, switching fabric, and egress modules). A packet received from an incoming link is first buffered at the ingress module, where a table lookup typically takes place to find out the egress module which the packet is destined to. In such an implementation, a local routing header will normally be placed in the front of the received packet. The local routing header may contain a number of information fields that are necessary to route the packet through the switching fabric, including the identity of the output link to which the packet needs to be routed. The extended packet is then dispatched to the desired egress module through the high speed, where some local buffering may be necessary. At the egress module, the packet is buffered until the outgoing link becomes available to transmit the packet. The local routing header is removed in the egress module before the packet is transmitted.

In a hierarchical communication network, a set of interconnected switches, each having the construction described above, can be unified in a logical group of nodes. From the network point of view, this logical group of nodes itself represents a generalized switch with input modules, output modules and generalized switching fabric. The network itself is a generalized switch on the highest level of hierarchy. Each logical group of nodes can maintain an internal routing header.

In this configuration, the packet could be lost in any of multiple locations within the ingress module, the switching fabric, or the egress module. The loss can be caused by buffer congestion, priority control, usage parameter control or a random electrical glitch leading to mis-routing, delineation error, checksum error, etc.

It is of practical interest, as indicated above, to be able to know whether, and how many, packets are lost within a switch or a logical group of nodes. It is of even greater interest to associate a packet loss with a particular traffic flow within the generalized switch.

SUMMARY OF THE INVENTION

This disclosure presents a simple and effective approach to the local packet loss measurement that is oriented to packet flows rather than the loss sources and allows to achieve high precision in a distributed switching environment with multiple loss reasons and multiple loss locations. The loss measurements are achieved by selecting the particular traffic flow, or flows, to be measured, identifying those flows in the ingress modules, marking each of the flows, and observing the packets of the flows at the egress modules. More specifically, a packet flow to be measured is broken into blocks of packets, and the last packet in the block is marked in an ingress module. At an egress module, the packets are counted using the block size as the counting modulus, and receipt of a marking packet triggers an update of the number of lost packets.

DETAILED DESCRIPTION

Figure 1:
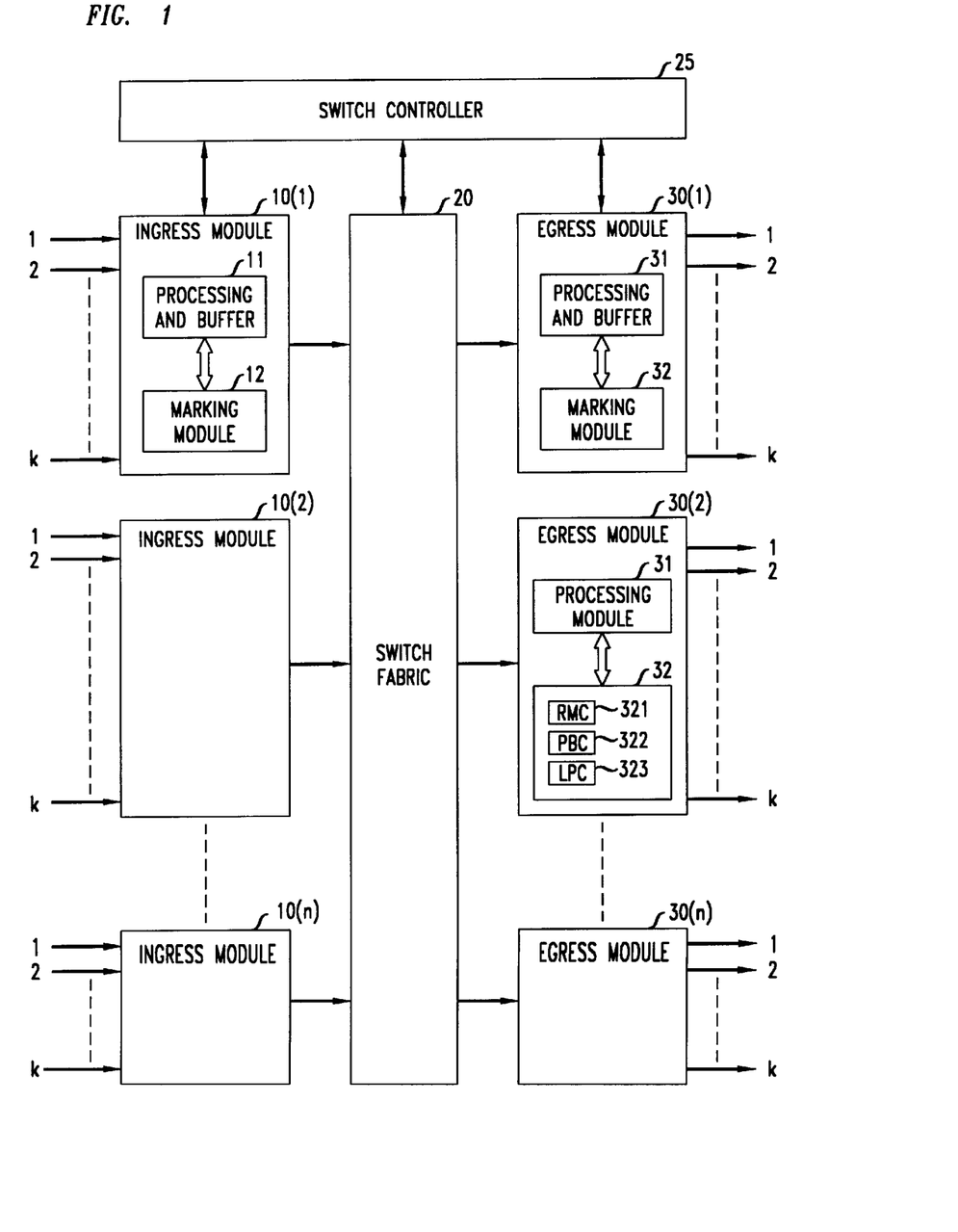
FIG. 1 presents a block diagram of a switch in accordance with the principles disclosed herein.

FIG. 1 presents a block diagram of a switch arrangement in accordance with the present disclosure. For the sake of illustration, it primarily refers to a single node, i.e., physical switch or router, but can be easily generalized to a logical group of nodes. Except for elements 12 and 32, and corresponding changes in switch controller 25, FIG. 1 depicts a conventional high-speed packet switch/router. That is, elements 10(1), 10(2), . . . 10(N) are conventional ingress modules, except for the fact that each includes a marking module 12; switching fabric 20 is a conventional switching fabric; and egress modules 30(1), 30(2), . . . 30(N) are conventional egress modules, except for the fact that each includes a counting module 32. Switch controller 25 is also a conventional controller, except for its enhanced capabilities that are associated with interactions of elements 12 and 32.

As indicated above, it is important to be able to measure packet loss based on distinct, selected, traffic flows. A traffic flow can be defined in different ways, and at various degrees of granularity, depending on the user desires, or requirements. For example, flow definition may be based on any subset or combination of the following criteria:

- an outgoing link (regardless of where the traffic originated);
- an egress module (regardless of where the traffic originated);
- an incoming/outgoing link pair;
- an ingress/egress module pair;
- a virtual connection identifier carried in the packet in connection-oriented networks;
- a packet source/destination pair in connectionless networks;
- a traffic priority class; etc.

If an incoming packet is only destined to one outgoing link, it is called a unicast packet. If it is destined to more than one outgoing link, it is called a multicast packet. In the multicast case, the switching fabric will typically generate a copy of the same packet for each outgoing link. An unicast packet can only associate with a single flow, but a multicast packet may associate with more than one flow (e.g., the flow to output link A and the flow to output link B).

The packet loss within the switch arrangement of FIG. 1 for a given traffic flow is generally characterized by the ratio of the number of packets that do not make it to the outgoing link(s), to the total number of packets that have been received at the ingress link(s).

It is straightforward to associate a set of packet loss counters with each known functional source of losses. The group of losses caused by random glitches, however, remains hard (if at all possible) to detect and attribute to an appropriate flow. Besides, in a distributed switch design such as the one shown in FIG. 1, policing and buffering may occur at multiple locations within a switch, thus making the overhead of direct "at the loss source" measurements and the consolidations too high. Furthermore, since these critical locations are spatially distributed, a time coherence problem may arise, i.e., measurements obtained at different buffering location may not be synchronized. The last problem becomes even more severe if different buffers along the flow path belong to different modules which are controlled separately, and inter-module communication takes random, highly variable amount of time.

To overcome the above problems, we measure packet loss based on selected traffic flow from the input links to the output links. This is accomplished by identifying within ingress modules 10 the packets that belong to the selected traffic flow, by counting and selectively marking those packets. In egress modules 30 those packets that belong to the same traffic flow are detected, and packet loss is ascertained through reference to the markings placed by the ingress modules.

Our novel approach is explained in more detail below where, for the sake of illustration, it is assumed that the desired packet loss measure is the one that corresponds to loss incurred by packets arriving at one selected ingress module (e.g., 10(1)) that are destined to some selected egress module (e.g., 30(2)), and where the packets have a particular selected priority class. For such a case, a traffic flow can be uniquely identified by a tuple(s,r,p), where s, r, and p indicate the ingress module, the egress module, and the priority class, respectively. In accordance with our approach, two types of activities are primarily involved:

For each flow for which packet loss measurement is supported, the sender (marking module 12 in ingress module 10(1), for example) distinctively marks a packet at the end of each packet block of predefined size.

The receiver (counting module 32 at egress module 20(2), for example) inspects the flow and infers the number of losses between each pair of consecutively received marked packets, using the marked packets for synchronization. The knowledge of the block size allows the receiver to track the number of transmitted blocks even if marked packets themselves are lost.

Illustratively, marking module 12 of ingress module 10(1) maintains a sender marking counter (SMC) for the identified flow. The SMC counter is a modulo B wrap-around down-counter that upon flow admission is initialized to B−1 by switch controller 25, where B is a predefined constant block size agreed upon by both the sender and the receiver. This counter is decremented each time a packet arrives to any of the input links of module 10(1), when such a packet is destined to egress module 30(2) and has the selected priority level. When the counter reaches zero, the packet currently in transmission is marked by setting a marking bit in the local routing header of the packet.

On the receiving side, counting module 32 within egress module 30(2) maintains a Receiver Marking Counter (RMC) 321, a Packet Block Counter (PBC) 322 and a Lost Packet Counter (LPC) 323 for this measured flow. The RMC is a modulo B wrap-around down-counter, whereas both PBC and LPC are saturating up-counters with zero initial value. Upon flow admission, the RMC is initialized to B−1 by controller 25 so that a first packet in the flow that is associated with the value B−1 at marking module 12 of ingress module 10(1) is also associated with the value B−1 at RMC 321 within egress module 30(2). Subsequently, RMC 321 is decremented upon receipt of every unmarked packet belonging to the corresponding flow, which in the case of the instant illustration, means every packet that arrives at module 30(2) that came from ingress module 10(1) and which has the selected priority level. If, in addition, the received relevant packet (packet belonging to the corresponding flow) is marked, then the current value of RMC 321 is added to LPC 323 for the given flow, and then RMC 321 itself is reset to B−1. The Packet Block Counter 323 keeps track of the total number of packet blocks transmitted and is incremented each time either a marked packet is received or the RMC is wrapped around and set to B−1 in the course of regular counting. The disclosed process makes use of the fact that the value of the Receiver Marking Counter at the epoch immediately preceding receipt of a marked packet is exactly equal to the number of packets, both marked and unmarked, that have been lost since the receipt of the most recent marked packet; provided that this number is less than the block size.

An estimate of packet loss ratio for any given flow can be obtained on demand by taking a ratio between the corresponding lost packet counter LPC and the product of the block size B and the packet block counter PBC.

Figure 2:
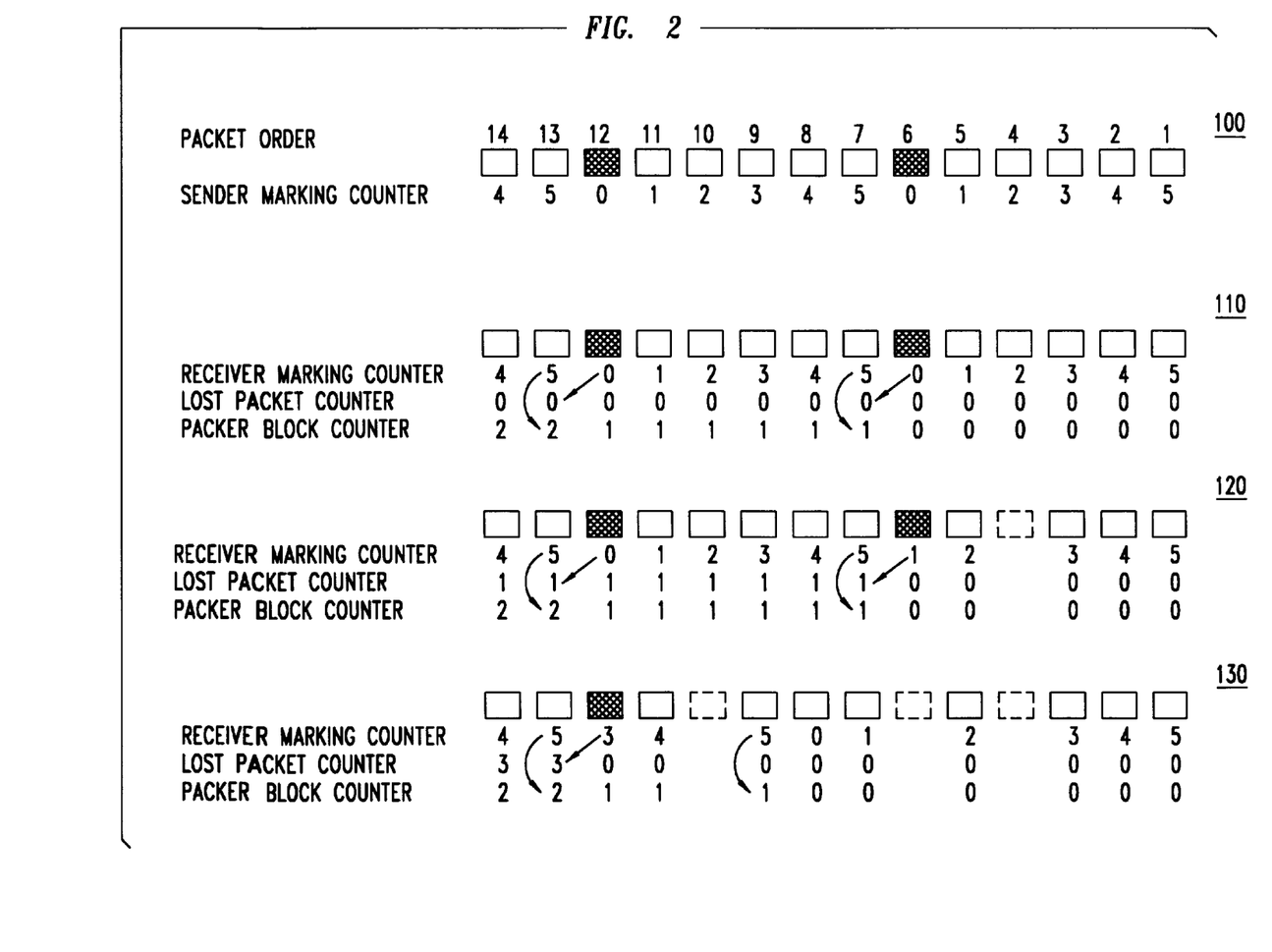
FIG. 2 illustrates the process of packet marking and counting.

FIG. 2 illustrates the disclosed process via an example where, for simplicity, the block size B is set to 6.

Row 100 corresponds to the sequence of packets that belong to a measured traffic flow; for example, the packets that arrive at ingress module 10(1), have a selected priority level and are destined to egress module 30(2). The numbers above row 100 designate the ordinal number of the packets below the numbers, and the numbers below the packets show the state of the counter within marking module 12 in ingress module 10(1).

Row 110 presents the ideal case when no loss of packets occurs during the switching operation. In this case, LPC 323 remains zero throughout the sequence because whenever a marked packet arrives, the value of RMC 321 is zero, so a zero is "added" to LPC 323 with each transmitted block. Separately, RMC 321 is reset by the marked packet to 5 (for the next packet) but, actually, RMC 321 would have reset anyway. Resetting of RMC 321 also increments PBC 322.

Row 120 presents a situation where the fourth packet in the illustrated sequence is lost. Because of the lost packet, RMC 321=1 when the first marked packet arrives. This 1 is added to the value held in LPC 323 when the marked packet resets RMC 321. As before, the reseting of RMC 321 increments PBC 322. The next block arrives fully intact, a value of zero is added LPC 323, resulting in LPC 323 maintaining the value 1, and PBC 322 is incremented again. After these two blocks are completed, PBC322=2 and LPC323=1. The measure of lost packets at this time is $$\frac{LPC \cdot 100}{LPC \cdot B} = \frac{1 \cdot 100}{2 \cdot 6} \cong 8\%$$

Row 130 presents a situation where the fourth, sixth, and tenth packets are lost. It is particularly interesting to note that the sixth packet, which is a lost packet, is also a marked packet. The first row of numbers below the packets of row 130 indicates the state of RMC 321. Since the sixth packet is missing, RMC 321 is not reset by a marked packet but reset itself after six packets have arrived. When RMC 321 does reset itself PBC 322 is incremented. When the twelfth packet arrives, which is a marked packet, the state of RMC 321 is 3. The arrival of a marked packet signals the addition of the state RMC 321 to the count in LPC 323. Consequently, the value 3 is added to LPC 323, RMC 321 is reset, and the resetting of RMC 321 causes the value of PBC 323 to be incremented.

FIG. 1 depicts marking module 12 to be associated with a processing and buffer module 11. Similarly, FIG. 1 depicts counting module 32 to be associated with processing and buffer module 31. Based on the above, it follows that marking module 12 should logically be coupled to the traffic flow ahead of all buffers and other elements within module 11 where a packet might be dropped. Likewise, counting module 32 should logically be coupled to the traffic flow past all of the buffers and other elements within module 31 where a packet might be dropped.

The description above dealt with a packet loss measurement for a particular chosen traffic flow. Of course, other traffic flow arrangements are possible, as indicated previously. What is more significant to note is that many different traffic flows can be concurrently measured. This is accomplished with a marker module 12 in each of ingress modules which can establish any number of packet markers, and likewise, with a counting module 32 in each of the egress modules which can establish any number of counter sets (RMC, PBC, and LPC). The maximum number of such sets may conveniently be set to the number of input links so that the integrity of all links could easily be tested simultaneously.

The above addresses traffic flow measurements for unicast packets. In multi-casting, as indicated above, the switch is permitted to duplicate packets and to distribute the developed plurality of packets to different specified output links. In such a case, packet loss measurements cannot be achieved with a marker module and a counting module as disclosed above because packets are sent to different receivers (egress modules, or output links). The following example clarifies the problem. Assuming a given incoming link L sends packet in the sequence

A1, A2, B1, C1, C2, B2, B3, C3, C4, A3, B4 where A designates a unicast packet addressed to destination X, B designates a unicast packet addressed to destination Y (perhaps in a different egress module than destination 1), and C designates a mulitcast packet addressed to both destination X and destination Y. If packet loss measurements are in effect for two flows, between L and X, and between L and Y, using, for example, block size 6, then clearly two marking counters are needed. The one associated with the flow between L and X counts the following packets

A1, A2, C1, C2, C3, C4, A3, and marks packet C4. The other counter, which is associated with the flow between L and Y, counts packets

B1, C1, C2, B2, B3, C3, C4, B4 and marks packet C3. Since both destinations X and Y receive exact copies of the multicast packets, then if a single marking bit were used, the X and Y destinations would observe both packets C3 and C4 as marked packets, and would be unable to correctly identify which marking pertains to their corresponding flow. The solution is to use separate markings for the different multicast destinations. This is achieved by sending a marking vector in the local routing header as illustrated, for example, in FIG. 3. The length of the vector, which corresponds to the number of different counts and different recipients of the packet, should be limited to whatever upper bound is imposed by the system on the multicasting process. For example, if the system allows to multicast to at most M recipients, then the marking vector should accommodate M counts.

Figure 3:
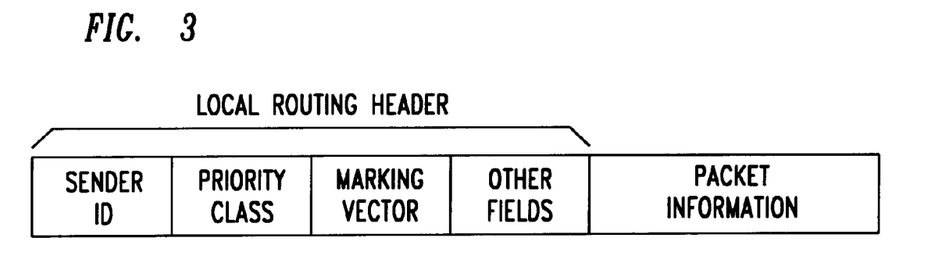
FIG. 3, presents an image of some of the fields in a local header of a packet flowing the FIG. 1 switch.

It may be noted that the other fields shown to be associated with the local header in FIG. 3 are fields that that assigned by the ingress modules. The "other fields" can include such fields as the "incoming link identifier", "egress module identifier", "outgoing link identifier", etc.

Figure 4:
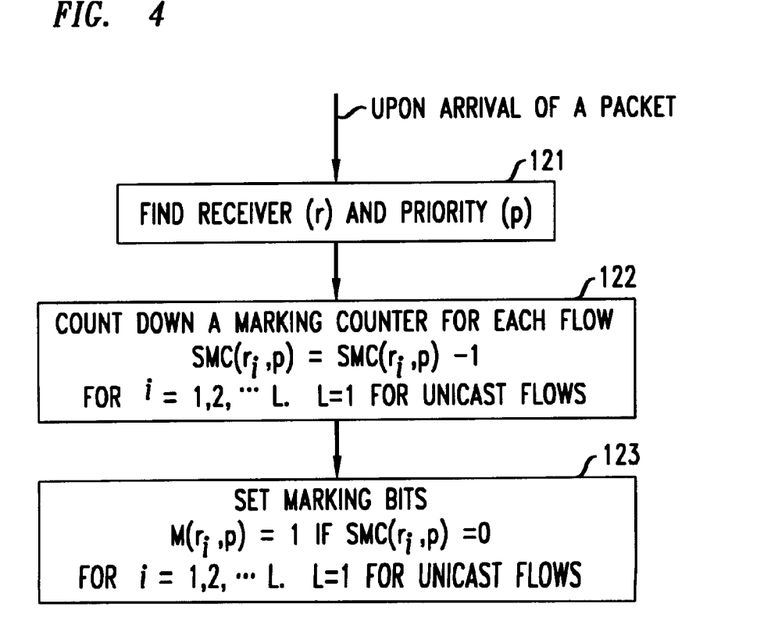
FIG. 4 is a flow chart of the packet-marking process.

FIG. 4 presents a flow chart of the process carried out within marker module 12 for an arrangement where flows of different priorities are entertained, and a separate measure of packet loss is desired for the different priority flows. To provide for this capability, marker module 12 maintains a set a set of SMC(r,p) counters, where $r=(r_1, r_2, \ldots, r_N)$ and $p=(p_1, p_2, \ldots, p_K)$ are the vectors of supported receivers and priority classes, respectively. When a packet arrives, block 121 identifies the flow to which the packet belongs and passes control to block 122. In general, identification of the flow to which a packet belongs can be achieved by means of a flow identification table that is looked up by a local index which is carried in the packet and contains the information about the destination within the switch and its priority class. A priority class p is assigned to the packet according to a congestion policy, which can be determined during a connection setup in an ATM network, or based on a local policy provisioned by a router. The destination information is always required to switch packets correctly across the switching fabric. From either information carried in the packet or stored in the flow identification table, the indication can be obtained whether the packet is unicast or multicast. Let this destination information be in the form of a receiver identifier vector $d=(d_1, d_2, \ldots d_L)$, where $L \leq N$ is the number of receivers (e.g., egress modules), that the packet will be trying to reach. In the case of a unicast packet, N is equal to one.

Block 122 decrements the corresponding $SMC(r_i, p)$ counter for that flow, repeating for each value of i up to L. Thereafter, control passes to block 123 where it is ascertained whether any of the marking counters $SMC(r_i, p)$ reached zero for any value of i. For those values of i that the marking counter did reach zero, the packet is marked, and with the next relevant packet the $SMC(r_i, p)$ counter is set to B−1.

Figure 5:
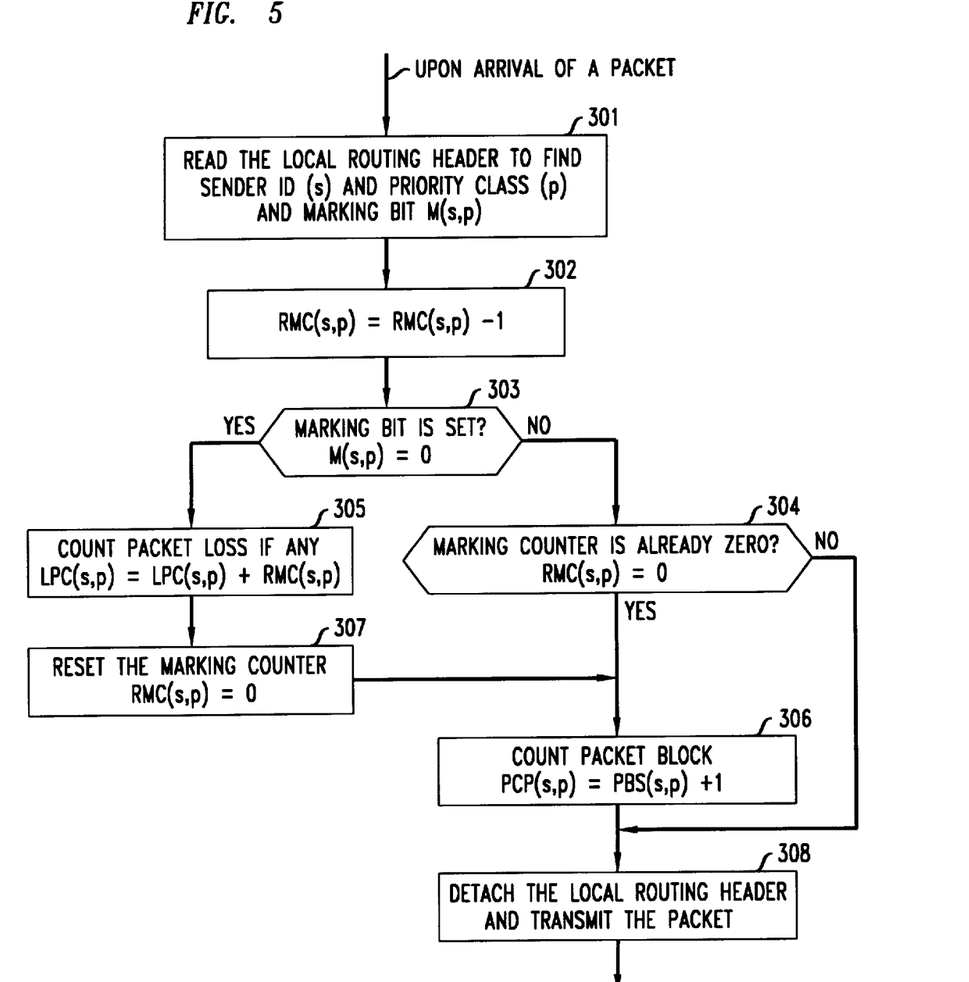
FIG. 5 is a flow chart of the packet counting process.

FIG. 5 presents a flow chart of the process carried out in counting module 32, corresponding to the process carried out in marking module 12. Specifically, on the egress side, three sets of counters per flow are maintained by a receiver r within counting module 32: RMC(s,p), LPC(s,p), and PBC(s,p), where $s=(s_1, S_2, \ldots, S_N)$ and $p=(p_1, p_2, \ldots, p_K)$ are the sender and priority vectors, respectively. Upon arrival of a packet, block 301 determines the sender's identifier s and the priority p by reading the values of the appropriate fields in the local header of the packet, accepts the packet as belonging to the traffic flow being counted, if appropriate, and passes control to block 302 which decrements RMC(s,p). Thereafter, block 303 examines the M(r, p) bit in the packet's local header. If the bit is set, which means that the packet is marked, control passes to block 305 where the current value of RMC(s, p) is added to the counter of the lost packets, LPC(s, p). Thereafter, block 307 sets RMC(s,p) to zero and passes control to block 306 where block counter PBC(s,p) is incremented. If block 303 determines that the considered packet is not a marked packet, control passes to block 304 where a test is performed to determine whether counter RMC(s,p) is already at zero. When such is the case, control passes to block 306 where the block counter PBC (s,p) is incremented. When decision block 304 finds the RMC(s,p) is not already at zero, control passes to block 308, as it does following action of block 306. Finally, block 308 detaches the local routing header inserted at an ingress module and transmits the packet to an outgoing link.

The proposed packet loss measurement method can be easily extended to support loss measurements for aggregated flows having a single destination (receiver) but multiple sources (senders) and/or priority classes. While a separate Marking Counter RMC(s,p) is maintained by receiver r for each sender-receiver pair and priority class, only single Lost Packet Counter LPC(f) and single Packet Block Counter PBC(f) are required for an aggregated flow f. While receipt of unmarked packets from sender s and with priority p still causes a decrementing of an individual RMC(s,p) counter, the same LPC(f) and PBC (f) counters are updated no matter on which leg of a multipoint-to-point flow a marked packet is received and to which priority class it belongs, using multiple RMC(s,p) counters. The receiver's algorithm in this case can easily be modified to take into account this effect since the aggregated counters LPC and PBC operate in a similar way as previously described. This modification leads to a significant reduction in the number of counters required, and it is especially true for a switch with a large number of ingress and egress modules.

As might have been observed from the illustrative example presented above, the disclosed process permits a straightforward characterization of the packet loss for a given traffic flow. Specifically, the packet loss ratio can be assessed in terms of the number of packets lost compared to the total number of packets successfully transmitted. This can be done merely by considering the information available within counting module 32. Specifically, a packet loss ratio can be expressed in terms of $$PLR(s, r, p) = \frac{LPC(s, p)}{B \times PBC(s, p)}.$$

In a real environment when the switch is operating user traffic dynamically changes with time. It is of practical interest to monitor and measure packet loss in a continuous-time fashion, although packet loss is bound to be time-dependent. One way to obtain a continuous reading is to periodically perform the packet loss ratio calculation, to reset all counter and start again, and to combine the periodically-obtained values in some manner that makes sense. For example, a smoothing function can be employed of the type $$PLR_{current} = \alpha \cdot PLR_{new} + (1-\alpha) \cdot PLR_{prev}$$

where $PLR_{current}$ is the newly computed running "average" value, $PLR_{new}$ is the new current packet loss ratio, $PLR_{prev}$ is the immediately previous running "average", and $\alpha$ is a selected decay factor. The frequency with which these computation takes place is, of course, a design choice.

As for the method of implementation, it may be noted that the various counters disclosed above are very simple counters that can be implemented with specific integrated circuit cards that are plugged into the ingress and egress modules. Those cards can also comprise a microprocessor that is programmed to implement the counters and to communicate with controller 25 (e.g., to send the controller the various counts, and to synchronize themselves to the controller's control signals).

we claim:

1. A system comprising ingress links, egress links, and apparatus interposed between said ingress and egress links, which system is adapted to measure packet loss on a traffic flow basis, the improvement comprising:

a first marking module associated with at least a first ingress link of said ingress links, where said marking module marks only one packet in each block of N packets, where N is a selected integer, belonging to a first packet flow, and a counting module employed during operational mode of said system, associated with at least one of said egress links that measures, with the aid of information imparted by said marking module, packet loss within said system relative to number of packets of said first packet flow that are successfully transmitted by said system.

2. The system of claim 1 where said block of packets comprises a given number of packets that belong to said given packet flow.

3. The system of claim 1 where said marking module is associated with more than one of said ingress links.

4. The system of claim 1 further comprising:

ingress modules, each of which is coupled to a preselected number of said ingress links, and egress modules, each of which is coupled to a preselected number of said egress links;

where said first marking module is included in at least one of said ingress modules, and said counting module is included in at least one of said egress modules.

5. The system of claim 4 where said first packet flow is set to correspond to any one or a combination of the following:

packets of a given source, packets arriving at said first link, packets arriving at said ingress module packets destined to a given egress module packets having a given virtual connection identifier, packets having a given source and destination pair, packets destined to a given destination, packets destined to a given egress link, packets having a given priority.

6. The system of claim 5 where said first marking module is coupled to all ingress links associated with said first marking module.

7. The system of claim 1, further comprising at least one additional marking module that is associated with a different ingress link and which marks a second packet flow.

8. The system of claim 7 where said counting module comprises:

a first receiver marking counter which is a wrap-around down counter synchronized to said first marking module, and decremented upon arrival of each packet belonging to said first packet flow, a second receiver marking counter which is a wrap-around down-counter synchronized to said additional marking module and decremented upon arrival of each packet belonging to a packet flow marked by said additional marking module, a first packet block counter that is incremented whenever said first receiver marking counter reaches a given state, a second packet block counter that is incremented whenever said second receiver marking counter reaches a given state, and a lost packet counter that is incremented with the state of said first receiver marking counter upon arrival of a marked packet belonging to said first packet flow, and incremented with the state of said second receiver marking counter upon arrival of a marked packet belonging said packet flow marked by said additional marking module.

9. The system of claim 1 further comprising additional counting modules that are associated with different egress links.

10. The system of claim 1 further comprising:

a first plurality of ingress modules, each of which is associated with a first plurality of ingress links, a second plurality of egress modules, each of which is associated with a second plurality of egress links, a first plurality of marking modules, one of whom is said first marking module, where each marking module of said first plurality of marking modules is associated with one ingress module of said plurality of ingress modules, and a second plurality of counting modules, one of whom is said counting module, where each counting module of said second plurality of counting modules is associated with one egress module of said plurality of egress modules.

11. The system of claim 1 where said first marking module comprises a counter that counts incoming packets belonging to said first packet flow, and marks a packet whenever said counter reaches a preselected state.

12. The system of claim 11 where said first marking modules marks a packet by setting a bit in a header that is attached to packets of said first packet flow.

13. The system of claim 11 where said counting module comprises:

a first plurality of receiver marking counters, each of which is a wrap-around down counter synchronized to a marking module, and decremented upon arrival of each packet belonging to a packet flow marked by the marking module with which the receiver marking counter is synchronized, a first plurality of lost packet counters, each of which is associated with one of said first plurality of receiver marking counters and is incremented with the state of its associated receiver marking counter upon arrival of a marked packet belonging to a packet flow marked by a marking module with which the associated receiver marking counter is synchronized, and a packet block counter that is incremented whenever any of said first plurality of receiver marking counters reaches a given state.

14. The system of claim 11 where said counting module comprises:

a first plurality of receiver marking counters, each of which is a wrap-around down counter synchronized to a marking module, and decremented upon arrival of each packet belonging to a packet flow marked by the marking module with which the receiver marking counter is synchronized, a first plurality of lost packet counters, each of which is associated with one of said first plurality of receiver marking counters and is incremented with the state of its associated receiver marking counter upon arrival of a marked packet belonging to a packet flow marked by a marking module with which the associated receiver marking counter is synchronized, and a first plurality of packet block counters, each of which is associated with one of said first plurality of receiver marking counters and is incremented whenever its associated receiver marking counter reaches a given state.

15. The system of claim 11 where said counting module comprises:

a receiver marking counter that is a wrap-around down counter synchronized to said counter of said first marking module, and decremented upon arrival of each packet belonging to said first packet flow, a lost packet counter that is incremented with the state of said receiver marking counter upon arrival of a marked packet belonging to said first packet flow, and a packet block counter that is incremented whenever said receiver marking counter reaches a given state.

16. The system of claim 15 further comprising a controller coupled to said lost packet counter and to said packet block counter, for developing a measure of packets lost in relation to packets successfully transmitted.

17. The system of claim 16 further comprising a module that incorporates the developed measure of packets lost into an average measure, and resets the lost packet counter.

18. The system of claim 17 where the said module that develops said average measure performs the calculation $PLR_{current} = \alpha \cdot PLR_{new} + (1-\alpha) \cdot PLR_{prev}$, where $PLR_{current}$ is a currently computed value of said average measure, $PLR_{new}$ is a current packet loss ratio evaluated by dividing the value contained in the lost packet counter by the product of the size of said block and the value contained in the packet block counter, $PLR_{prev}$ is the immediately previous value of said average measure, and $\alpha$ is a selected decay factor.

19. The system of claim 1 where said first packet flow is set to correspond to any one or a combination of the following:

packets of a given source, packets arriving at said first link, packets having a given virtual connection identifier, packets having a given source and destination pair, packets destined to a given destination, packets destined to a given egress link, packets having a given priority.

20. The system of claim 1 where said system is a packet switch or router.

21. The system of claim 1 where said system is a logical group of switches or routers.

22. A method for measuring packets lost in a system that includes an ingress module responsive to a plurality of input links, an egress module coupled to a plurality of output links, and a system including a transmission medium interposed between said ingress module and said egress module, comprising the steps of:

at the ingress module inspect incoming packets to identify packets that belong to a preselected traffic flow, responsive to each identified packet that belongs to said preselected traffic flow, increment a wrap-around counter, mark an identified packet when said counter reaches a given state, and at an egress module inspect incoming packets to identify packets that belong to a preselected traffic flow, responsive to each identified packet that belongs to said preselected traffic flow, advance a wrap-around down-counter, increment a packet block counter whenever said wrap-around down-counter reaches a given state, and increment a lost packet counter with the state of said wrap-around down-counter when an identified packet is marked, and reset said wrap-around down-counter.

23. The method of claim 22 further comprising a step of developing a measure of average number of packets lost per block.

* * * * *